INVENTOR.
Arnold G. Bowles

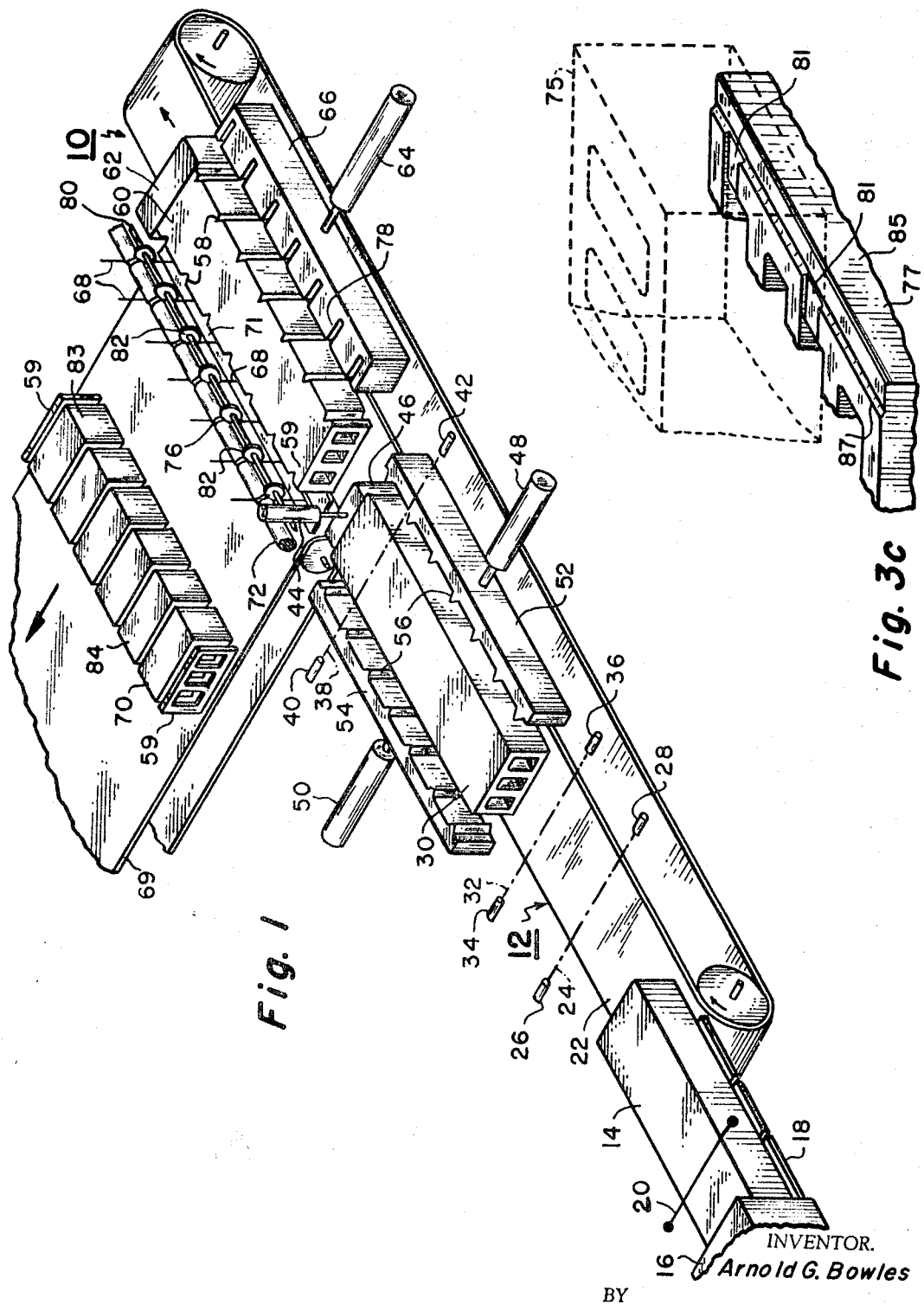

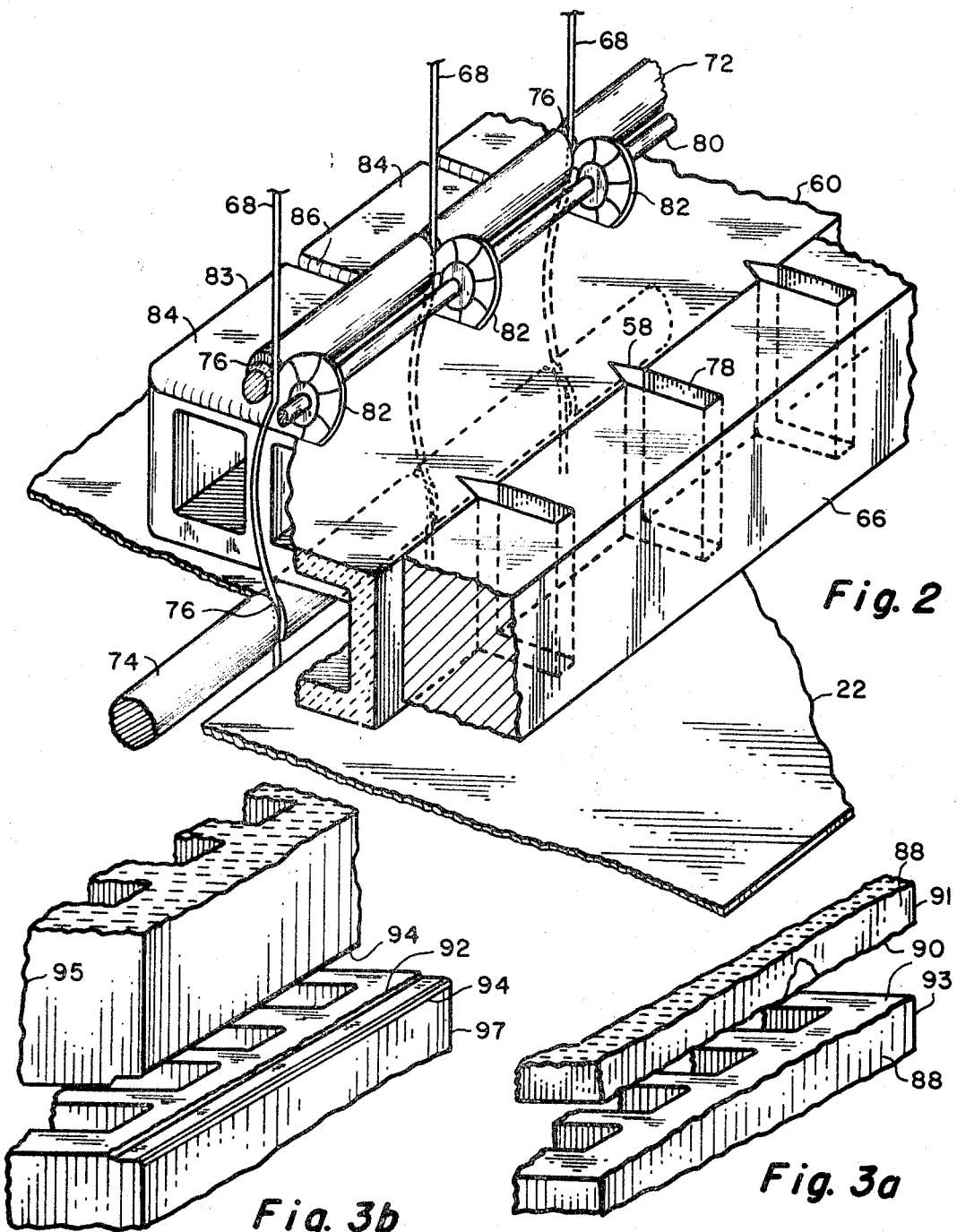

HIS ATTORNEYS 3,461,196
METHOD FOR THE MANUFACTURE OF BRICK AND TILE
Arnold G. Bowles, 7 Elm St., Warren, Pa. 16365
Original application Mar. 19, 1964, Ser. No. 354,498, now Patent No. 3,350,757, dated Nov. 7, 1967. Divided and this application Sept. 14, 1967, Ser. No. 667,753
Int. Cl. B28b 11/16
U.S. Cl. 264—148         5 Claims

ABSTRACT OF THE DISCLOSURE

Method for cutting segments having at least one cut edge with a recessed configuration to prevent breaking and chipping of the cut edge comprising cutting a bar from a clay column, forming a plurality of spaced parallel grooves in at least one surface of the bar and moving the bar relative to a plurality of stationary cutting wires having the same spacing as the center lines of the grooves to substantially bisect the grooves and to cut the bar into segments having at least one edge with said recessed configuration.

---

This application is a division of application Ser. No. 354,498 filed Mar. 19, 1964, now Patent No. 3,350,757.

This invention relates generally to improvements in the manufacture of brick and tile and in particular to a new and novel method for cutting clay bars into brick or tile.

In conventional methods for manufacturing brick and structural facing tile, moist, unfired and pliable fire clay is extruded continuously into an elongated column which is conveyed onto the cutting table of a cutting machine whereupon it is cut transversely. The segmented column is then "hacked" or stacked on carts which, when loaded, are conveyed into drying ovens where the segments, i.e., bricks or tiles, are thoroughly dried preparatory to being fired.

In the conventional methods the extruded clay column is cut into bricks or tiles as it is being extruded. A wire cutter drags a plurality of parallel spaced wires through the moving clay column. A slotted cutting table is disposed to support the clay column during cutting, and the slots in the table permit the wires to pass through after cutting the column. Since the column is continuously moving, it is necessary to propel the cutter in the direction of the moving extruded column to avoid a diagonal cut. Thus, the cutting table and wire cutter are designed for limited travel, such travel being synchronized, insofar as possible, with the direction and speed of the extruded clay. At the conclusion of the cut, the machine returns to its original position preparatory for the next cut. The segmented column is pushed from the cutting table onto a succeeding conveyor by the uncut advancing column of clay. The succeeding conveyor runs at a faster speed than the clay column so that the brick or segments are spaced for hacking. An example of such conventional apparatus is the Bonnot Saber Electro Pneumatic Cutter, No. 162, manufactured by The Bonnot Co. of Canton, Ohio, a division of C. L. Gougler Machine Co., Kent, Ohio.

The conventional method described above produces a cut of variable quality. It is not possible to extrude the clay at an accurately consistent speed so that it is difficult to synchronize the movement of the cutter with that of the column. The cut is often crooked because the column and the cutter are not accurately synchronized as the wires pass through the clay.

In conventional cutting methods the practical speed at which the extrusion machine and cutter may be run is limited because of inertia problems. As the extrusion machine is run at higher speeds it becomes increasingly difficult to effect synchronization of the cutter with the extruded clay column. The method of the present invention provides a means whereby the speed of extrusion and cutting is not so limited. In the present method clay bars are separated from the extruding clay column, and the cutter cuts a clay bar rather than a moving column. Since synchronization of an extruded clay column with a moving cutter is not necessary, the speed of extrusion (and cutting) may be greatly accelerated over what has previously been considered to be practical. For example, some conventional cutting operations are limited to speeds of from 30 to 60 feet per minute, but by employing my method it is possible to utilize speeds of up to 120 feet per minute.

The quality of the surface of brick or tile obtained by employing conventional cutting methods is satisfactory for many applications, particularly where minor edge defects do not show. Such quality is not satisfactory, however, where a smooth faced brick or tile is desired. For example, where brick or tile is glazed by spraying the face of such brick or tile with a slurry of ceramic materials and water prior to firing so as to obtain a smooth, glossy surface to the face of such member, ragged and broken edge defects become quite noticeable and undesirable. A high percentage of glazed tile and brick which has been cut by conventional methods must be rejected and scrapped due to ragged and broken edge defects. Such defects are not readily apparent until after firing and, consequently, these rejections are costly.

Edge defects also occur because of handling problems encountered with the conventionally cut bricks and tiles. For example, in the manufacture of glazed brick and structural tile, the glazed edges are exceptionally prone to chipping. Among the reasons for chipping is the fact that when the tile is glazed, the spray of glazing material is applied with the adjacent pieces abutting one another along their wire cut edges. This results in the glaze bridging the gap from brick to brick or tile to tile along the line of the cut. Also, when the ware is set on kiln carts, two or more pieces are frequently set as a unit with their cut edges abutting one another so that the wet glaze will bridge the gap. This causes the pieces to become joined by the glaze along the abutting top square edges. Upon breaking the pieces apart, the glaze at the edges breaks unevenly and frequently large pieces of glaze will chip off the brick surface.

A common edge defect is caused by setting marks. It is general practice to cross-set brick or tile on kiln carts. Such setting consists of stacking the greenware with their long edges meeting at right angles. The weight of the setting or abutting extruded clay segments causes the pieces to bed into one another to some degree. The deformation so caused, though small, is very noticeable along the cut edges of glazed brick or tile that is cut and glazed in the conventional manner.

Another reason for excessive chipping of the edges of glazed ceramic tile or brick is caused by the fact that the method of cutting with a wire results in a sharp, strained edge which is very susceptible to breakage when stressed. Where bricks or tiles are cross-set, rocking or jostling such as is normally encountered when kiln carts are moved, causes excessive chipping of the abutting edges. The stresses imposed by the cutting method employed causes the edges to be weakened and, consequently, easily broken.

I have devised a method for cutting an extruded clay column whereby it is not necessary to move the cutter and synchronize its motion with that of the relatively erratic extrusion in order to obtain a straight cut. By employing my method, a brick or tile may be produced that is not susceptible to edge defects caused by stresses imposed by wire cutting. The brick or tile produced by my method is not susceptible to edge chipping when glazed. Also, greenware produced by my method may be cross-set in the conventional manner without fear of offensive setting marks.

In the drawings, I have illustrated apparatus for carrying out preferred embodiments of my invention in which:

FIG. 1 is a perspective view of a clay extrusion cutter and associated apparatus;

FIG. 2 is an enlarged and fragmented perspective view of a portion of the cutter of FIG. 1;

FIGS. 3a and 3b are fragmented perspective views of the chipped edges of conventionally cut and glazed tile (FIG. 3a) and of the edges of tile produced by the method of the present invention (FIG. 3b);

FIG. 3c is a fragmented perspective view of a tile, produced in accordance with the present invention, showing setting marks caused by a cross-set tile (shown in dotted outline);

Figure 4:
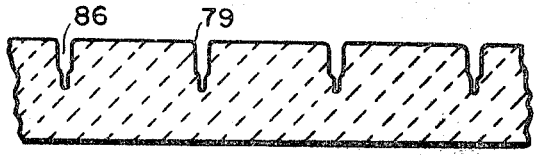
FIG. 4 is a fragmented cross-sectional view along the longitudinal dimensions of an extruded column of fire clay that exhibits transverse grooves formed into its top surface in accordance with the present invention.

In FIGS. 1 and 2 of the drawings a wire cutter shown generally at 10 is positioned along a conveyor 12 that is disposed to receive and convey an extruded fire clay column 14.

Column 14 is pushed by an extrusion machine (not shown) through an extrusion die 16 onto the cutting table 18 of a wire cutter (not shown) that is disposed to effect a single cut of the column 14 by means of a vertical stroke of wire 20.

The wire cutter associated with table 18 and wire 20 may be of conventional construction and is not shown or described in detail in the present specification. Such a machine is not required to effect highly accurate cuts of column 14 since the end pieces of clay bars cut from the extrusion are scrapped and returned to the extrusion machine for salvage.

When the extrusion column 14 is extruded beyond table 18, it slides over belt 22 of conveyor 12. When it intersects the light path 24 directed by light source 28 to photoelectric cell 26, an electric impulse causes the wire cutter that is associated with table 18 and wire 20 to propel wire 20 vertically to cut a clay bar of predetermined length from column 14. The clay bar continues to be pushed forward onto conveyor 12 by action of the severed column 14. As the bar is pushed along belt 22 of conveyor 12, it interrupts the light path 32 of another light source 36 which is directed to photoelectric cell 34. This creates an electric impulse that causes conveyor 12, which has been at rest, to start up and transfer the clay bar forward at a speed faster than the extrusion rate of the severed column 14 so that column 14 is separated from the clay bar.

When the front end of the clay bar interrupts light path 38, which is directed to photoelectric cell 40 by source 42, an electric impulse causes the conveyor 12 to stop and simultaneously causes a vertically positioned pneumatic cylinder 44 to extend its plunger so as to lower a gate 46 in front of the bar. Momentum carries the clay bar against the gate 46 so that it is indexed between horizontally positioned frames 52 and 54. In FIG. 1, bar 30 is in the position described wherein it abuts gate 46 after having caused pneumatic cylinder 44 to lower the gate and stop conveyor 12 by interrupting light path 38.

Frame members 52 and 54 are mounted on the ends of the plungers of pneumatic cylinders 48 and 50. As soon as the conveyor 12 has stopped, cylinders 48 and 50 extend their plungers so as to convey frame members 52 and 54 into engagement with the sides of the bar 30. Frames 52 and 54 are provided with opposing vertically mounted knife blades 56 which press opposing vertical grooves 58 in the sides of the bar as the plungers of cylinders 48 and 50 are extended. The cylinders 48 and 50 are disposed to extend their plungers only momentarily so that they immediately retract frames 52 and 54 to the position shown in FIG. 1. The cylinder 44 is activated to retract its plunger and raise gate 46 at the conclusion of the strokes of cylinders 48 and 50. Such operation and cycle is timed so that it is complete by the time the next bar, cut from clay column 14 by wire 20, has interrupted light path 32.

The conveyor restarts and conveys the clay bar to the position occupied by clay bar 60 as shown in the embodiment of FIG. 1. The front end of a clay bar advancing from the position of bar 30 to the position of bar 60 contacts a fixed (but adjustable) stop 62 so as to be indexed adjacent wire cutter 10. As the bar reaches this position, the conveyor 12 stops since the succeeding bar interrupts light path 38 to assume the position of bar 30 (FIG. 1). As the conveyor 12 comes to a stop, a pneumatic cylinder 64 is energized to extend its plunger and contact the side of the clay bar with a pusher block 66 which pushes the clay bar laterally through fixed vertically mounted wires 68 of the cutter 10 and onto laterally extending conveyor belt 69. Thus, the clay bar is cut by the wires 68 into segmented bricks or tiles as it is pushed laterally onto the conveyor belt 69 of a laterally extending conveyor. Segmented bar 70 (FIG. 1) is one which has been pushed through the wire cutter 10 by pusher block 66. A slide plate 71 provides support for the clay bars as they are transferred laterally from conveyor 12 onto conveyor belt 69.

Wires 68 of wire cutter 10 are vertically mounted to frame members (not shown) in a conventional manner. These wires are accurately indexed by means of horizontally mounted cylindrical bars 72 and 74 (see FIG. 2). The cylindrical bars 72 and 74 are provided with spaced circumferential grooves 76. The circumferential grooves 76 are spaced along the cylindrical bars 72 and 74 so that each circumferential groove 76 of cylindrical bar 72 is vertically aligned with corresponding circumferential grooves 76 of cylindrical bar 74. Each of the wires 68 extend through a corresponding pair of circumferential grooves 76 on cylindrical bars 72 and 74 so as to be vertically indexed between cylindrical bars 72 and 74 for cutting the indexed clay bars along their vertical grooves 58.

A shaft 80 is rotatably mounted adjacent and parallel to cylindrical bar 72. A plurality of discs 82 are mounted along the shaft 80. Discs 82 are adjustably mounted to the shaft 80 and may be positioned along its length. As shown in FIG. 2, discs 82 are indexed along shaft 80 so that their planes of rotation coincide with the spaced circumferential grooves 76 of cylindrical bar 72, the corresponding grooves 76 of cylindrical bar 74 and the vertically mounted wires 68. Shaft 80 is mounted in front of and slightly below cylindrical bar 72 so that discs 82 contact the surface of a clay bar being pushed laterally from conveyor 12 through wire cutter 10 and form transverse grooves 86 along its top surface before the clay bar is cut by the wires 68. Since wires 68 extend through the planes of rotation of discs 82, the clay bar is cut along grooves 86. Also, the clay bar is indexed on conveyor 12 when it contacts stop 62 so that as it is pushed laterally through wire cutter 10, wires 68 bisect vertical grooves 58.

It will be noted that the transverse grooves formed in the clay bar by discs 82 are aligned with vertical grooves 58.

Pusher bar 66 is provided with a plurality of vertically disposed parallel spaced slots 78 along its clay bar contacting face. Slots 78 are spaced to coincide with wires 68 and when pusher bar 66 contacts a clay bar in which grooves 58 have been formed, the slots 78 will coincide with the grooves 58. As the pusher bar 66 completes pushing a clay bar through the wire cutter 10 and wires 68 emerge from the trailing edge of the clay bar through the grooves 58, they are received by the slots 78 and the segmented bars may be pushed laterally beyond wire cutter 10 onto conveyor belt 69.

Slots 78 must be of sufficient depth to account for the fact that during cutting the wires 68 will be bowed in the manner shown by FIG. 2.

Indexing or cylindrical bars 72 and 74 and rotatably mounted shaft 80 are mounted to frame members (not shown) in an obvious conventional manner. The size of the individual tiles or bricks 84 may be quickly and easily adjusted by removing the indexing bars 72, 74, and pusher bar 66 and replacing them with ones having the resired spaced circumferential grooves 76 and slots 78 respectively. Discs 82 may be appropriately adjusted along the shaft 80 and may be attached to the shaft 80 by means of set screws (not shown) or other convenient means.

Shaft 80 may be positioned adjacent cylindrical bar 72 so that discs 82 partially extend into the circumferential grooves 76. By this arrangement discs 82 are properly indexed along shaft 80 so as to be aligned with wires 68 and grooves 58.

Since the cutting machine that is disposed to actuate wire 20 and cut column 14 into clay bars effects such a cut on a moving clay column, the ends of the clay bar are not perfectly vertical and have not been cut along grooves 58. Knife blades 56 of frames 52 and 54, discs 82 and wires 68 of wire cutter 10 are indexed so that when cutting the clay bars along grooves 58 and 86, short end pieces 59 are provided to eliminate use of the rough cut ends of the clay bars. These pieces are returned for reuse in the extrusion machine.

Grooves 86 and 58 provide the segmented clay bars or greenware brick or tile with a recessed edge. When the brick or tile is to be glazed, such a recessed edge provides protection against chipping and setting marks as will be described in greater detail hereinafter.

The exact contour of the grooves is, of course, dependent on the shape of the discs 82 or knife blades 56. It is preferred that these grooves be formed in such a manner that they provide a rounded edge to the face of the brick or tile. Such a groove is illustrated by the cross-sectional view of FIG. 4. In this figure, grooves 86 have been formed by discs 82 to provide rounded corners 79. The resultant brick or tile, when glazed, will exhibit smooth and even edges.

In FIG. 3a. there is shown the corners of two adjacent glazed tiles 91 and 93 of conventional manufacture which were positioned with cut edges adjacent one another during the spraying of glazing materials onto their surfaces 88. These pieces were then dried while still positioned adjacent one another, and when separated, visible ragged edges 90 resulted.

The tiles 95 and 97 of FIG. 3b were positioned with wire cut edges adjacent one another, sprayed with glazing material and separated in a similar manner to the tiles of FIG. 3a, except these tiles were cut by an apparatus embodying features of the present invention such as that shown by FIG. 1, and the cuts were effected along grooves such as grooves 86 and 58. The ragged or chipped wire cut edge 92 is not on the edge of the face of the tile as in the case of the tile of FIG. 3a, instead, is along the side where it will not show when the block is laid in the conventional manner. The edges 94 of the tiles 95 and 97 are smooth and sharp.

FIG. 3c is a fragmented perspective view of two clay (as extruded and cut) cross-set tiles. These pieces are set on their sides, as is common practices, to protect their faces. The top tile 75 is shown in dotted outline so that the setting marks 81 on the side of the bottom tile 77 are clearly discernible. Setting marks 81 are, of course, caused by the pieces bedding into one another. In a conventionally cut piece the setting marks extend along the side of the tile into its face so as to be offensively noticeable. Tile 77, however, was fabricated in accordance with the present invention so as to be provided with a recessed edge 87 and marks 81 terminate at edge 87 rather than extend into face 85.

In FIGS. 5 through 8, a wire cutter 110 performs the function of wire cutter 10 of the apparatus of FIG. 1. A column of clay 114 is extruded from an extruding machine (not shown) in a manner similar to that by which column 14 of the embodiment of FIG. 1 is extruded. Clay column 114 slides over a fixed table 118 that is formed with a plurality of spaced parallel fingers 119 extending in the direction of wire cutter 110. Clay bars are cut from the column 114 by a wire 120 which is part of a vertical wire cutter (not shown) that responds to an electric impulse created when column 114 interrupts the light path 124 directed to a photosensitive device 126.

The severed clay bar continues to be conveyed from table 118 onto a table 112 by action of the severed column 114. Table 112 is formed with spaced parallel extending fingers 122 which extend toward table 118 and which are complementary with and extend between the fingers 119 of table 118.

Figure 7:
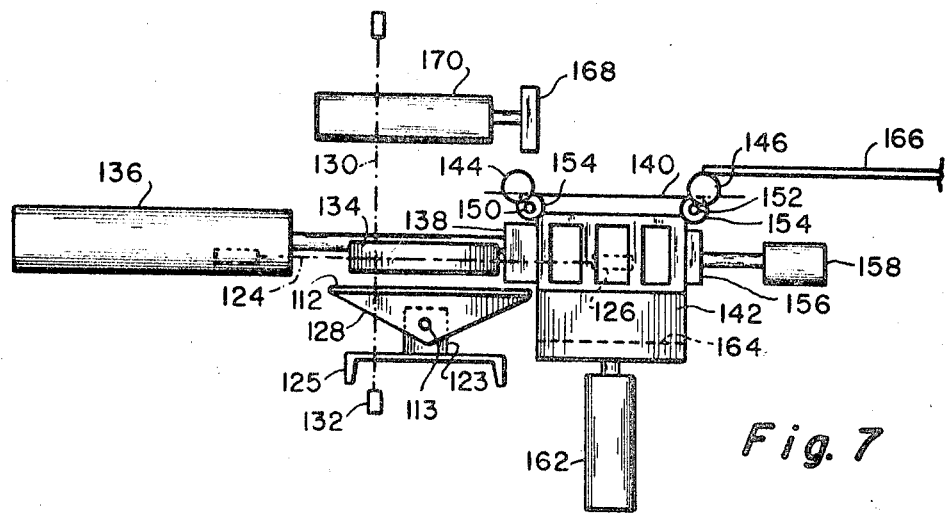
FIGS. 7 and 8 are end elevation views of the apparatus of FIGS. 5 and 6 showing a green clay bar being cut.
Figure 8:
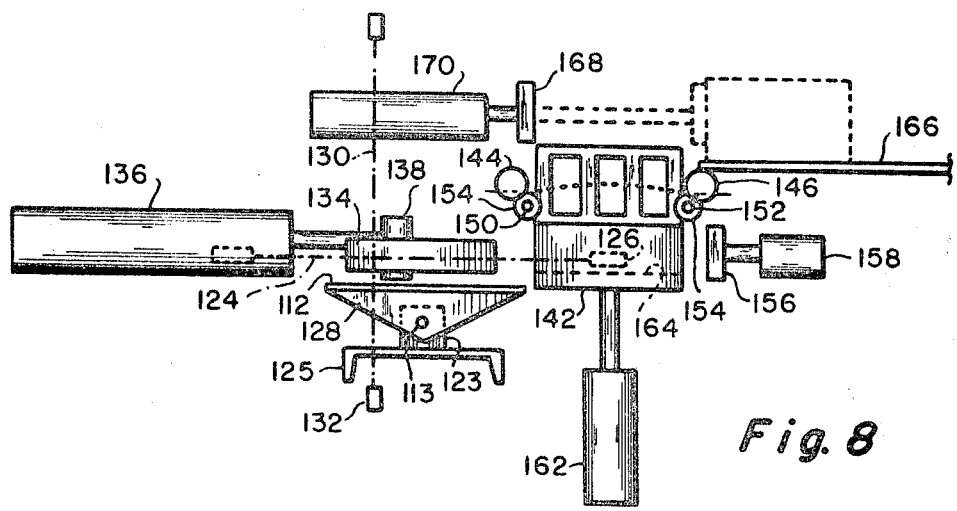

A double acting pneumatic cylinder 123 with a double ended rod 113 is mounted to a frame member 125 (see FIGS. 7 and 8). Depending leaves 128 mounted to each end of table 112 are attached to the ends of the rod 113 of cylinder 123. When a clay bar is cut from column 114 and extends onto the table 112 by being pushed by column 114 so that it interrupts light path 130 that is directed to photosensitive device 132, the cylinder 123 is activated to move the table 112 into a position adjacent wire cutter 110 (see FIG. 6). The clay bar 160 comes to rest against a fixed stop 134 and is indexed in respect to wire cutter 110.

Fingers 122 of table 112 slide from under column 114 but remain adjacent fingers 119 of table 118 so that column 114 is offered continued support though table 112 has advanced clay bar 160 to a position adjacent wire cutter 110.

At the instant the clay bar 160 engages the fixed stop 134, a pneumatic cylinder 136 is activated to extend its plunger and advance a pusher platen 138 to push or transfer the clay bar laterally from table 112 under the horizontally positioned cutting wires 140 of wire cutter 110 and onto an elevator platform 142.

The cutting wires 140 of wire cutter 110 are horizontally mounted to a frame (not shown) and extend laterally from the direction of movement of table 112.

Two cylindrical indexing bars 144 and 146 are mounted in a common horizontal plane to frame members (not shown) and are provided with circumferential grooves 148 which perform the function of grooves 76 of indexing bars 72 and 74 of the embodiment of FIGS. 1 and 2. The wires 140 extend through the bottom portions of grooves 148. Two rotatable horizontally positioned shafts 150 and 152 (FIG. 7) are mounted to frame members (not shown) and are positioned adjacent to and parallel with the cylindrical indexing bars 144 and 146, respectively. Both shafts 150 and 152 are provided with a plurality of adjustable discs 154 which are aligned with the circumferential grooves 148 of the indexing bars 144 and 146 and the indexed wires 140.

Discs 154, mounted to shaft 150, are positioned to form indexed transverse grooves into the top of a clay bar as it is transferred laterally from table 112 onto elevator platform 142.

As the clay bar is transferred from table 112 to elevator platform 142, it meets a retractable stop 156. Retractable stop 156 is mounted to the plunger of pneumatic cylinder 158 and these members are disposed to position the clay bar 160 on the platform 142. As stop 156 and cylinder 158 position bar 160, pneumatic cylinders 136 and 123 retract their plungers so that platen 138 and table 112 are positioned to receive another clay bar. Platform 142 is mounted to the plunger of a vertically mounted pneumatic cylinder 162. As soon as clay bar 160 is positioned on platform 142, pneumatic cylinder 162 extends its plunger so that platform 142 is elevated and the clay bar 160 is pushed upwardly and cut by wires 140 into segments (see FIG. 8).

Discs 154 of rotatable shafts 150 and 152 are positioned slightly inside of and below indexing bars 144 and 146 so that as clay bar 160 is conveyed upwardly, these discs bear on the sides of the bar 160 and form matching vertical grooves in the sides of the bar in advance of the cutting wires 140. The vertical grooves formed by discs 154 of both shafts 150 and 152 connect with the transverse grooves formed across the top of bar 160 by discs 154 of shaft 150 during lateral transfer of the bar from table 112. Also, both the transverse top and vertical side grooves formed by discs 154 are indexed so that wires 140 substantially bisect such grooves.

Elevator platform 142 is formed with slots 164 (FIG. 5) which are aligned with and receive wires 140 so that when cylinder 162 has fully extended its plunger, wires 140 are positioned within the slots 164 of platform 142 and the top surface of platform 142 is on a level with a fixed platform 166 to which the now segmented clay bar 160 is to be transferred. Slots 164 of platform 142 also receive the forming discs 154 when the platform is elevated.

When platform 142 reaches its highest position, a pusher platen 168 which is mounted on the plunger of a pneumatic cylinder 170 pushes the now segmented clay bar onto the fixed platform 166 in the manner shown in dotted outline by FIG. 8. As soon as such transfer is complete, pneumatic cylinders 162 and 170 retract their plungers and platen 168 and platform 142 return to the positions shown by FIG. 7. In the interim, table 112 will have positioned a clay bar which will now be transferred by pneumatic cylinder 136 and platen 138 from table 112 onto platform 142.

It will be understood that the actions of the apparatus utilized in carrying out the method of the present invention are synchronized so as to be substantially continuous in periodically cutting columns 14 and 114 into clay bars, transferring such bars from tables 18 and 118 onto conveyor 12 and table 112, respectively, and positioning such bars adjacent cutters 10 and 110, and processing clay bars through the cutters so as to provide a constant supply of bricks or tiles.

The method of the present invention may be carried out by the apparatus shown in FIGS. 1 and 2 and in FIGS. 5–8 which provide a recessed edge along the transverse cut edges of the tile or brick since these edges have been cut transversely from clay columns 14 and 114 along transverse grooves. The vertical cut edges of the brick or tile are also formed with recessed edges since the wire cuts take plate along vertically formed grooves.

The top extruded edges 83 (see FIGS. 1 and 2) of the tiles or bricks which correspond to the top edges of columns 14 and 114 have not been recessed. These edges are even and acceptable since they are extruded rather than cut edges. However, if it is desirable to effect recessed edges along the ends or sides of the pieces corresponding to the top edges of the extruded column, this may be readily accomplished by providing an extrusion die of a contour that will provide such shape to the edges of the extrusion.

Where only one face of the brick or tile is to be glazed, it will not be necessary to effect the vertical grooves, the application of vertical grooves on one or both sides of the clay bar being optional and preferred only where one or more sides of the brick or tile is to be glazed or the appearance of the side of the piece is of importance.

Figure 5:
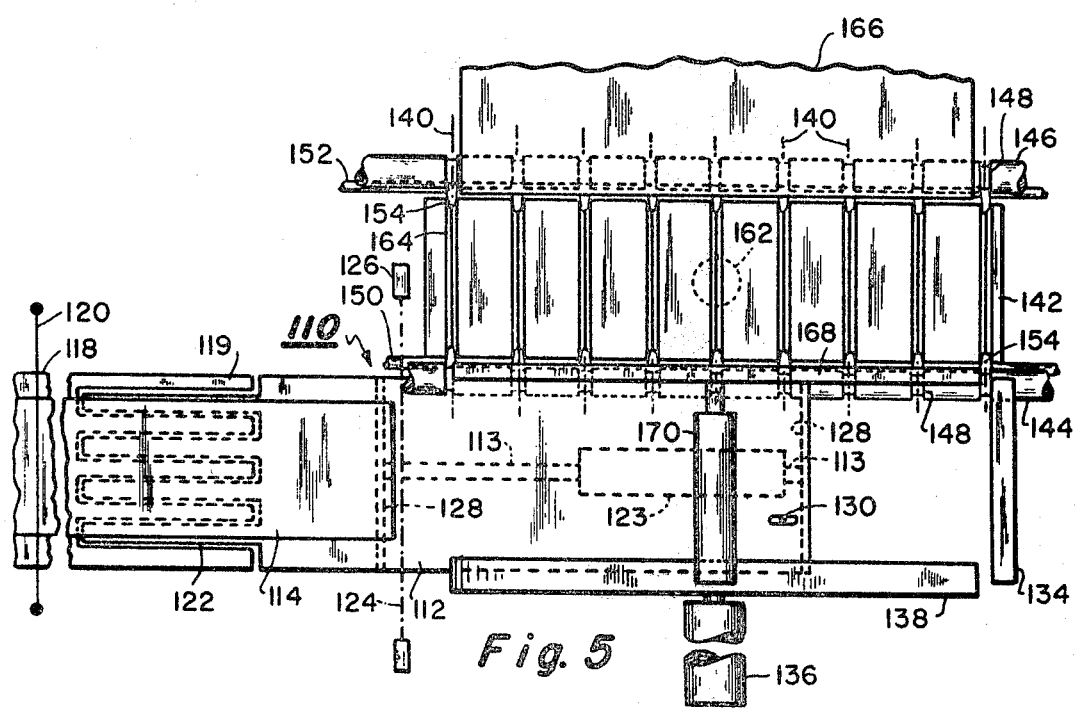
FIG. 5 is a top plan view of a wire cutter and receiving table which may be used to perform a second embodiment of the present invention.
Figure 6:
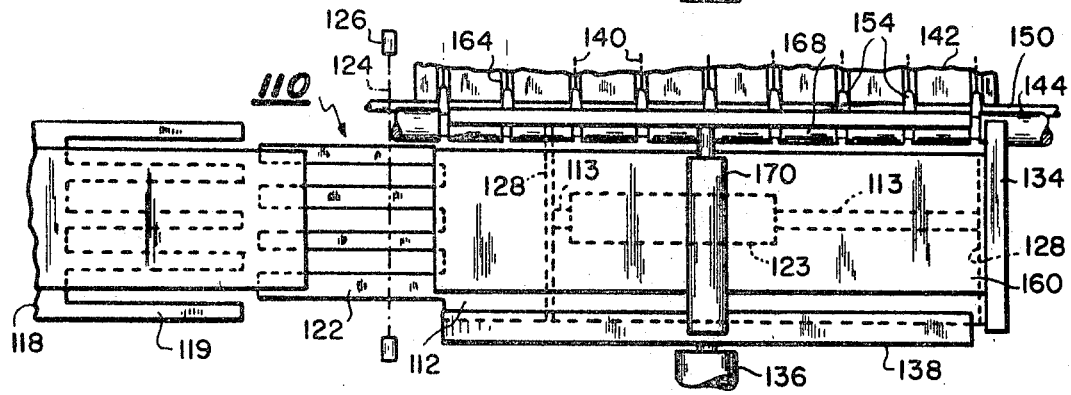
FIG. 6 is a plan view of the apparatus of FIG. 5 after having positioned a clay bar for cutting.

In the apparatus shown in the drawings the groove forming discs (discs 82 of FIGS. 1–3 and discs 154 of FIGS. 5–8) are shown to be positioned to contact the surface of either a laterally moving clay bar (FIGS. 1–3) or a vertically moving clay bar (FIGS. 7 and 8) and the grooves are formed in the surfaces of the bar in advance of the cutting wires (wires 68 of FIG. 1 and 140 of FIG. 5).

Although this sequence of forming the grooves constitutes a preferred embodiment of my invention it is obvious that such discs may be conveniently positioned to form the grooves after the cutting wires have passed through the clay bar. For example, in the embodiment shown by FIG. 2 discs 82 could be positioned on the opposite side of the indexing bar 72 and grooves 86 would be between the cut edges of the tiles or bricks 84. Discs 154 (FIG. 7) could be positioned above indexing bars 144 and 146. Also, frames bearing knife blades, such as frames 52 and 54 (FIG. 1) may be positioned to form grooves in the clay bars after they are segmented and before the segments are separated. Since the extruded clay is relatively soft and pliable the results would be substantially the same.

Since the method of the present invention involves the cutting of individual clay bars which are individually pushed through wire cutters which are vertically or horizontally mounted in a stationary manner, particularly desirable, clean and square cuts are obtained. Also, since the clay bars are grooved by means of knife blades 56 and discs 82 of the embodiments of FIGS. 1 and 2 and discs 154 of the embodiments of FIGS. 5 through 8, the resulting tile or brick has improved edges which provide distinctive advantages over brick or tile cut by prior art methods, particularly where such tile is to be glazed and where tile or brick is to be cross-set on carts in the usual manner.

I claim:

1. A method of forming a plurality of segments from a column of clay moving along a cutting table comprising:
    (1) cutting an elongated bar from said clay column;
    (2) moving said bar away from said column at a rate of speed in excess of the rate of movement of said column to separate said bar from said column;
    (3) interrupting the movement of said bar;
    (4) forming a plurality of spaced grooves transversely of at least one elongated surface of said bar with the apexes of said grooves spaced in correspondence with the size of said segments; and
    (5) cutting said bar into segments at said grooves.

2. A method as set forth in claim 1 wherein said grooves are formed in opposite vertical faces of said bar and in the upper face of said bar and said grooves on said vertical and upper faces are aligned.

3. Method of forming a plurality of segments from a column of clay moving along a cutting table comprising:
    (1) cutting an elongated bar from said clay column;
    (2) moving said bar away from said column at a rate of speed in excess of the rate of movement of said column to separate said bar from said column;

(3) interrupting the movement of said bar at a first position;
(4) forming a plurality of spaced grooves transversely of at least one elongated surface of said bar with the apexes of said grooves spaced in correspondence with the size of said segments;
(5) moving said grooved bar to a second position; and
(6) cutting said bar into segments at said grooves.

4. A method as set forth in claim 3 wherein said grooves are formed by pressing.

5. A method as set forth in claim 3 wherein said bar is cut into segments by moving said bar past stationary cutting wires having the same spacing as the apexes of said grooves to produce a recessed portion on a cut edge of each segment.

References Cited

UNITED STATES PATENTS

| | | | |
|---|---|---|---|
| 357,965 | 2/1887 | Nesmith | 83—9 |
| 663,689 | 12/1900 | Staley | 25—105 |
| 1,108,287 | 8/1914 | Warstler | 25—110 |
| 1,131,433 | 3/1915 | Smith | 264—148 |
| 1,157,862 | 10/1915 | Gerbsch | 25—112 |
| 1,469,852 | 10/1923 | Simpson | 25—105 |
| 1,973,092 | 9/1934 | Mooney | 264—148 |

ROBERT F. WHITE, Primary Examiner

S. J. LANDSMAN, Assistant Examiner

U.S. Cl. X.R.

31—23; 264—151, 157